United States Patent [19]

Svensson

[11] Patent Number: 6,010,280
[45] Date of Patent: Jan. 4, 2000

[54] TRANSFERRING BULK GOODS BETWEEN CONVEYORS

[75] Inventor: Per Bertil Kennet Svensson, Örkelljunga, Sweden

[73] Assignee: BMH Marine AB, Bjuv, Sweden

[21] Appl. No.: 08/809,588

[22] PCT Filed: Oct. 11, 1995

[86] PCT No.: PCT/SE95/01166

§ 371 Date: Mar. 24, 1997

§ 102(e) Date: Mar. 24, 1997

[87] PCT Pub. No.: WO96/11864

PCT Pub. Date: Apr. 25, 1996

[30] Foreign Application Priority Data

Oct. 12, 1994 [SE] Sweden ................................. 9403468

[51] Int. Cl.[7] .................................................. B65G 53/08
[52] U.S. Cl. ............................................... 406/56; 406/67
[58] Field of Search ................................. 406/56, 12, 28, 406/29, 53, 67; 198/638, 642, 658, 670, 671

[56] References Cited

U.S. PATENT DOCUMENTS 3,130,879  4/1964  Messing ..................................... 406/67
3,220,539  11/1965  Anagnos .................................. 198/658
5,299,888  4/1994  Wysong et al. ........................... 406/67
5,562,366  10/1996  Paulson .................................... 406/67

FOREIGN PATENT DOCUMENTS 391675  11/1990  Austria .
4038236 A1  8/1991  Germany .
2038751  7/1980  United Kingdom .

*Primary Examiner*—Kenneth Noland
*Assistant Examiner*—Gene O. Crawford
*Attorney, Agent, or Firm*—Smith, Gambrell & Russell, LLP

[57] ABSTRACT

For transferring bulk goods from a screw conveyor to a pneumatic conveyor, use is made of a cellular feeder. The shafts of the cellular feeder and the screw conveyor are preferably substantially parallel. The outlet of the screw conveyor is formed as a longitudinal slot formed in the casing of the screw conveyor and being of a length which is at least twice the length of the pitch of the feeding screw, and communicates with the inlet port of the cellular feeder for throwing out and discharging the goods substantially radially. The outlet of the cellular feeder is formed at an angular distance from the inlet port of the cellular feeder and is adapted to discharge the goods substantially axially and is connected to or forms the inlet of the pneumatic conveyor.

23 Claims, 4 Drawing Sheets

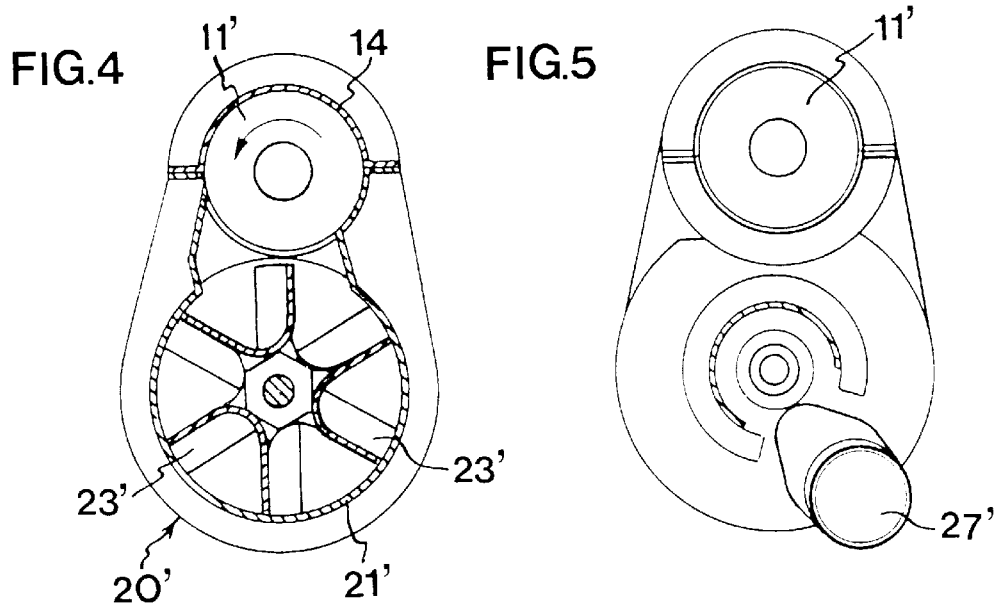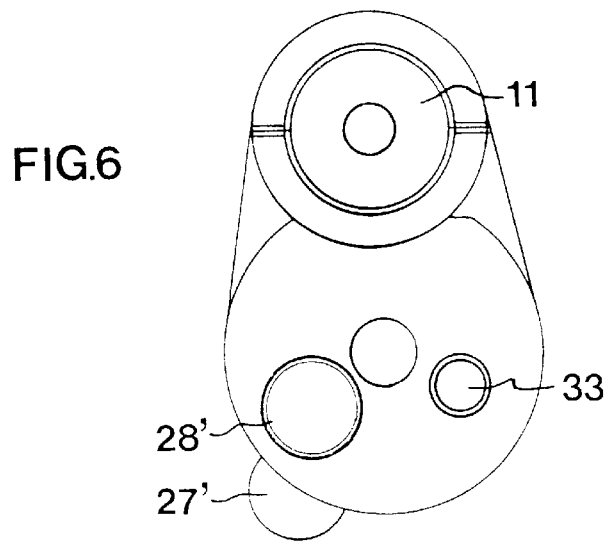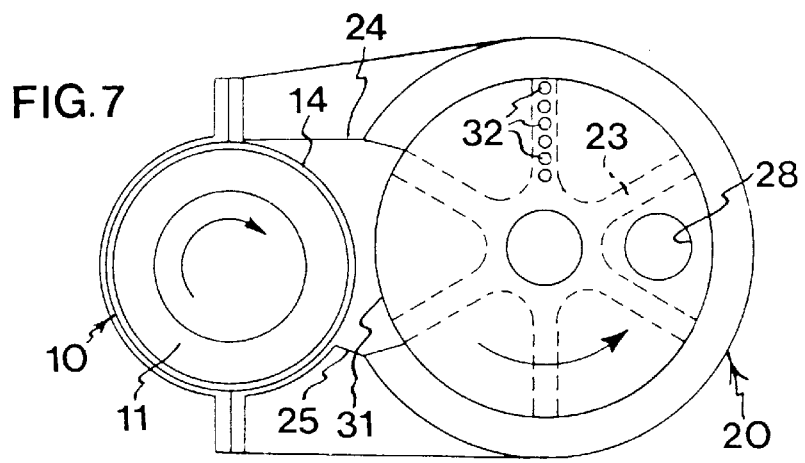

FIG.8
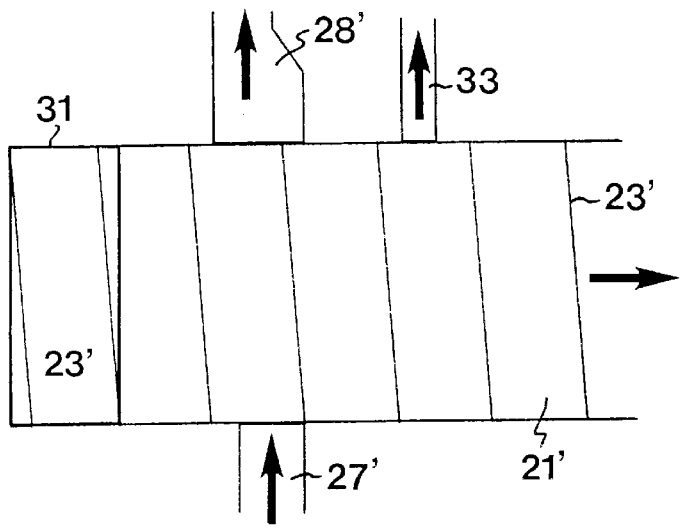
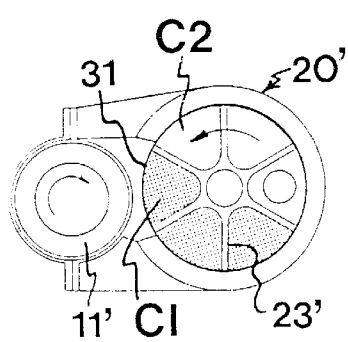
FIG.9
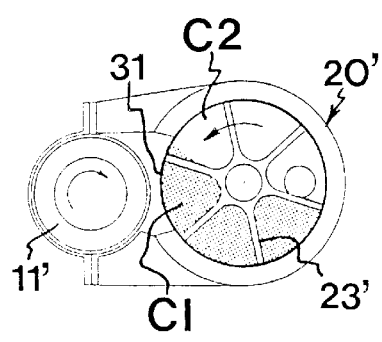
FIG.10
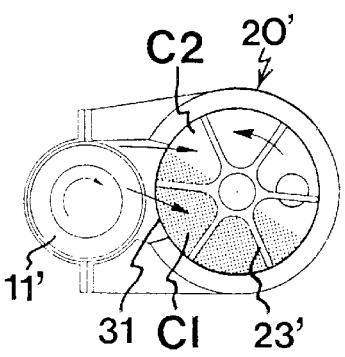
FIG.11
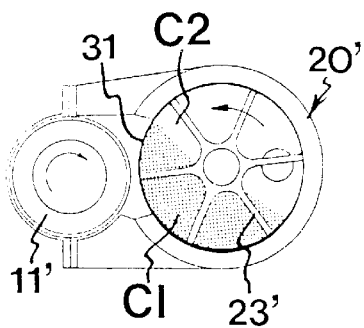
FIG.12
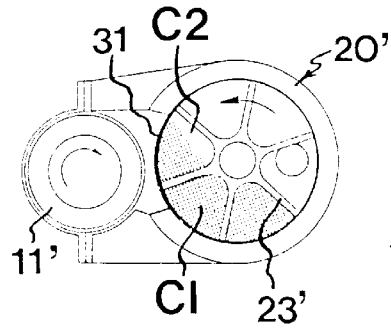
FIG.13
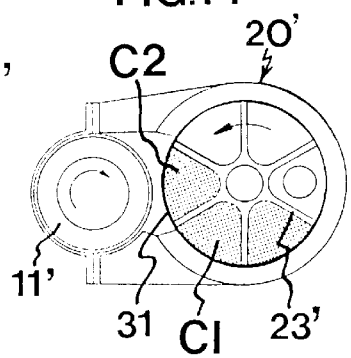
FIG.14

TRANSFERRING BULK GOODS BETWEEN CONVEYORS

The present invention relates to an apparatus for transferring bulk goods between two successively coupled conveyors, the first being a supplying conveyor and the second a discharging conveyor, a transition housing being arranged between the supplying conveyor and the discharging conveyor.

Such an apparatus is disclosed in Swedish Patent SE-B-406,070. In this case, the transition occurs between two conveyors which can be swung relative to one another by a transition housing being formed between the two conveyors and having a rotationally symmetrical labyrinth seal between two portions in the transition housing, which are rotatable relative to one another. This known apparatus has excellent properties for transferring goods from one screw conveyor to another. When transferring goods from a screw conveyor to a pneumatic conveyor, it has been found that this type of transition housing does not result in the desired function since the transfer must be carried out at a very high material conveying speed and since the air pressure in the pneumatic conveyor acts on the supplied goods in the screw conveyor.

It is per se known from Austrian Patent AT-B-391,675 to transfer bulk goods from a screw conveyor to a pneumatic conveyor, but this prior-art apparatus suffers from several drawbacks. Such a drawback arises by the flow of goods in this apparatus being fed radially into a gas flow which flows at high speed so as to be entrained by the gas flow into the tubing of the pneumatic conveyor. Therefore, this design also has the drawback that the air pressure in the pneumatic conveyor acts directly on the goods supplied by the screw conveyor. This in turn results in an impairment of the function of the screw conveyor and, if it comes to the worst, stoppage in the screw conveyor.

EP-A-0,122,621 discloses another apparatus for transferring bulk goods from a screw conveyor to a pneumatic conveyor. In this prior-art apparatus, a transition housing is arranged at the discharge end of the screw conveyor. Within this transition housing, the screw of the screw conveyor is extended by two discharge screw portions having flights of opposite threading for directing the flow of material towards a radial outlet in the housing. The air required for suspending the bulk goods is supplied at opposite ends of the transition housing to make the air flush the goods along the flights of the discharge screws and discharge the goods through the radial outlet. Also in this known apparatus, the excess pressure in the transition housing will act directly on the bulk goods in the screw conveyor. Thus, also this apparatus suffers from the above-mentioned drawbacks.

A possibility of obviating the problems that arise when the excess pressure in the pneumatic conveyor acts directly on the goods conveyed in the screw conveyor, is to continuously operate the screw conveyor completely filled. This is, however, not always possible or desirable.

It is actually known to use cellular feeders for transferring bulk goods from a feed hopper to a pneumatic conveyor. An example of such a known apparatus is to be found in EP-A-0 086 312. One more example of such a transferring or dosing device is disclosed in U.S. Pat. No. 4,015,754. In these known feeding devices for pneumatic conveyors, it is a matter of transferring goods from a slowly moving storage of material to a rapid air flow.

None of the above-mentioned known apparatus having a cellular feeder aims at transferring goods from a screw conveyor to a pneumatic conveyor. In fact, it would be possible to let the goods from the discharge end of the screw conveyor fall into an inlet hopper of a known cellular feeder as disclosed in GB-A-2,038,751, but such a construction is not very efficient. If the inlet hopper to the cellular feeder is open, this technique may besides cause dust formation. In addition, this solution of the transfer problem could not be used in screw conveyors operating with large, rapid flows of material, for instance 150 tonnes/h or more.

The above-mentioned GB-A-2,038,751 permits the material picked up by the screw conveyor to fall down, under the action of gravitation, into an inlet hopper to the cellular feeder arranged below. The same technique is applied in the apparatus according to U.S. Pat. No. 5,299,888. In this known apparatus, one or two feeding screws are arranged at the lower end of a hopper for the bulk goods, and the object of the conveying screw or screws is to preclude any bridging or jamming in the flow of material from the hopper to the cellular feeder arranged below. This is achieved by the flow of direction of the bulk goods being changed and the goods being scraped up to an opening at the upper end of the inlet chamber of the cellular feeder. Besides, the publication states that this opening is of approximately the same length as the pitch of the screw flight. This last-mentioned known apparatus therefore suffers from the same drawbacks as the apparatus according to GB-A-2,038,751.

A further drawback of the known apparatus for transferring bulk goods from a screw conveyor to a pneumatic conveyor is that the constructions limit the possibilities of optional orientation of the axis of the screw conveyor. In the cases in which the transfer occurs from a screw conveyor to a pneumatic conveyor, the transfer has been based on the utilising of gravitation, which means that the outlet of the screw conveyor must be arranged above the feeding chamber in the cellular feeder or the inlet to the cellular feeder. In addition to this drawback, the known apparatus also suffer from the drawback that, as mentioned above, they are not suited for transfer of bulk goods from screw conveyors operating with large, rapid flows of material, for instance 150 tonnes/h or more.

One object of the present invention therefore is to provide an apparatus for efficient transfer of bulk goods from the discharge end of such screw conveyors to a supplying position in a pneumatic conveyor. Another object is to facilitate the transfer of bulk goods from a screw conveyor to a pneumatic conveyor without the air pressure in the pneumatic conveyor affecting the conveying operation of the screw conveyor. Still another object of the invention is to provide an apparatus which permits a great freedom of choice in respect of the screw conveyor orientation in space, i.e. it can be arranged in an optional position, for instance, horizontal, inclined or vertical, without the transferring efficiency deteriorating. A further object of the invention is to provide an apparatus which makes it possible to transfer more bulk goods per given volume of the cellular feeder.

These and other objects of the invention are achieved if the apparatus is designed as stated in claim 1. The subclaims define particularly preferred embodiments.

To sum up, the invention thus resides in an apparatus which serves to transfer bulk goods from a screw conveyor to a pneumatic conveyor. This apparatus comprises a cellular feeder. The shafts of the cellular feeder and the screw conveyor are preferably substantially parallel. The outlet of the screw conveyor is designed as a longitudinal slot formed in the casing of the screw conveyor and being of an axial length which is at least twice the pitch of the conveyor screw, and is connected to the inlet port of the cellular feeder for throwing out and discharging the goods substantially radially. The outlet of the cellular feeder is arranged at an angular distance from the inlet port of the cellular feeder and is designed for discharging the goods substantially axially and is connected with or forms an inlet in the pneumatic conveyor.

According to the invention, an excellent filling ratio of the cellular feeder is obtained even when its shaft extends substantially vertically. A further great advantage is that by using the throwing action, the apparatus permits transfer of a larger bulk goods quantity per given volume of the cells of the cellular feeder since the filling ratio of the cellular feeder will be higher and the goods supplying speed will also be higher. One more advantage is that owing to the increased transfer speed and capacity, the apparatus can be made small and compact, even if large quantities of material are involved.

A few embodiments of an apparatus according to the invention will now be described in more detail with reference to the accompanying drawings.

FIG. 4 is a sectional view along line IV—IV in FIG. 3.

FIG. 5 is a sectional view along line V—V in FIG. 3.

FIG. 6 is a view along line VI—VI in FIG. 3.

FIG. 7 is a schematic end view of a further embodiment of the invention.

FIG. 8 is a spread-out view of the contact lines between the cell-defining vanes and the circumferential surface of the cellular feeder and the relative positions of inlet and outlet and evacuation ducts.

FIGS. 9–14 illustrate six successive instantaneous positions during a circular motion for filling a cell in the embodiment according to FIG. 3.

Figure 1:
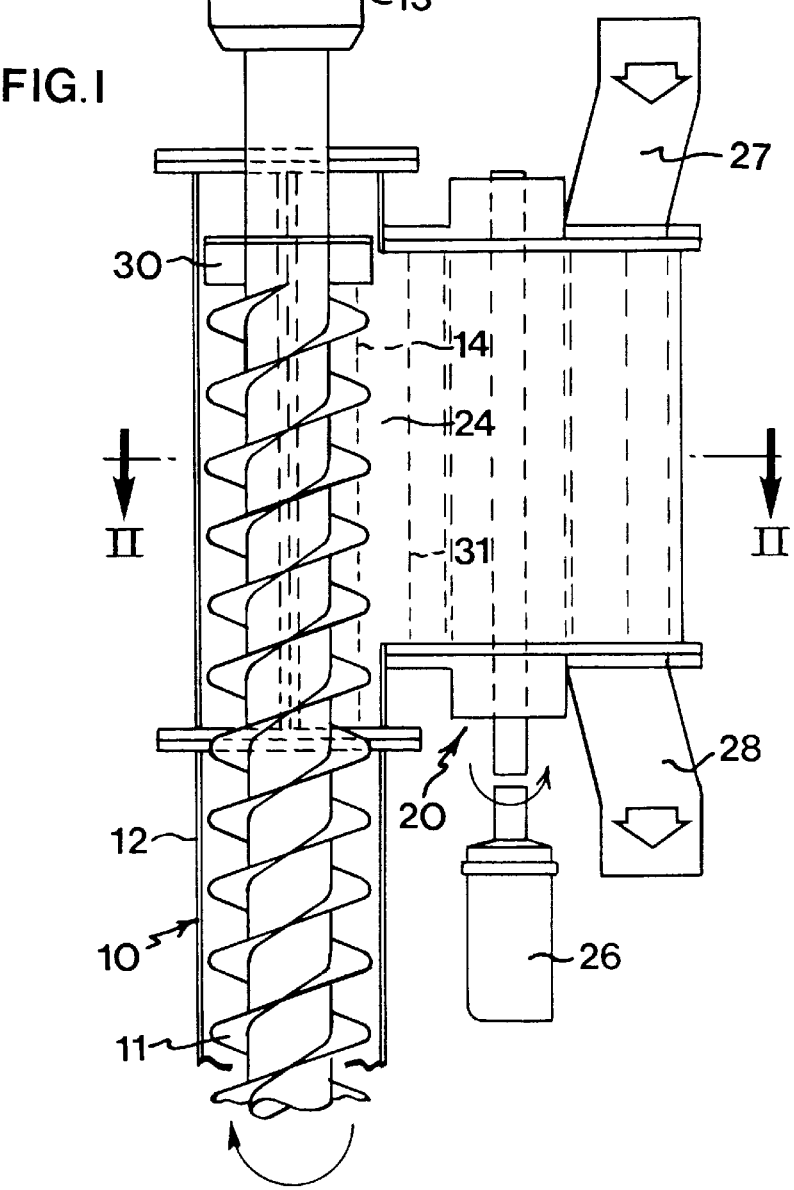
FIG. 1 is a partly sectional view of an apparatus according to the present invention.
Figure 3:
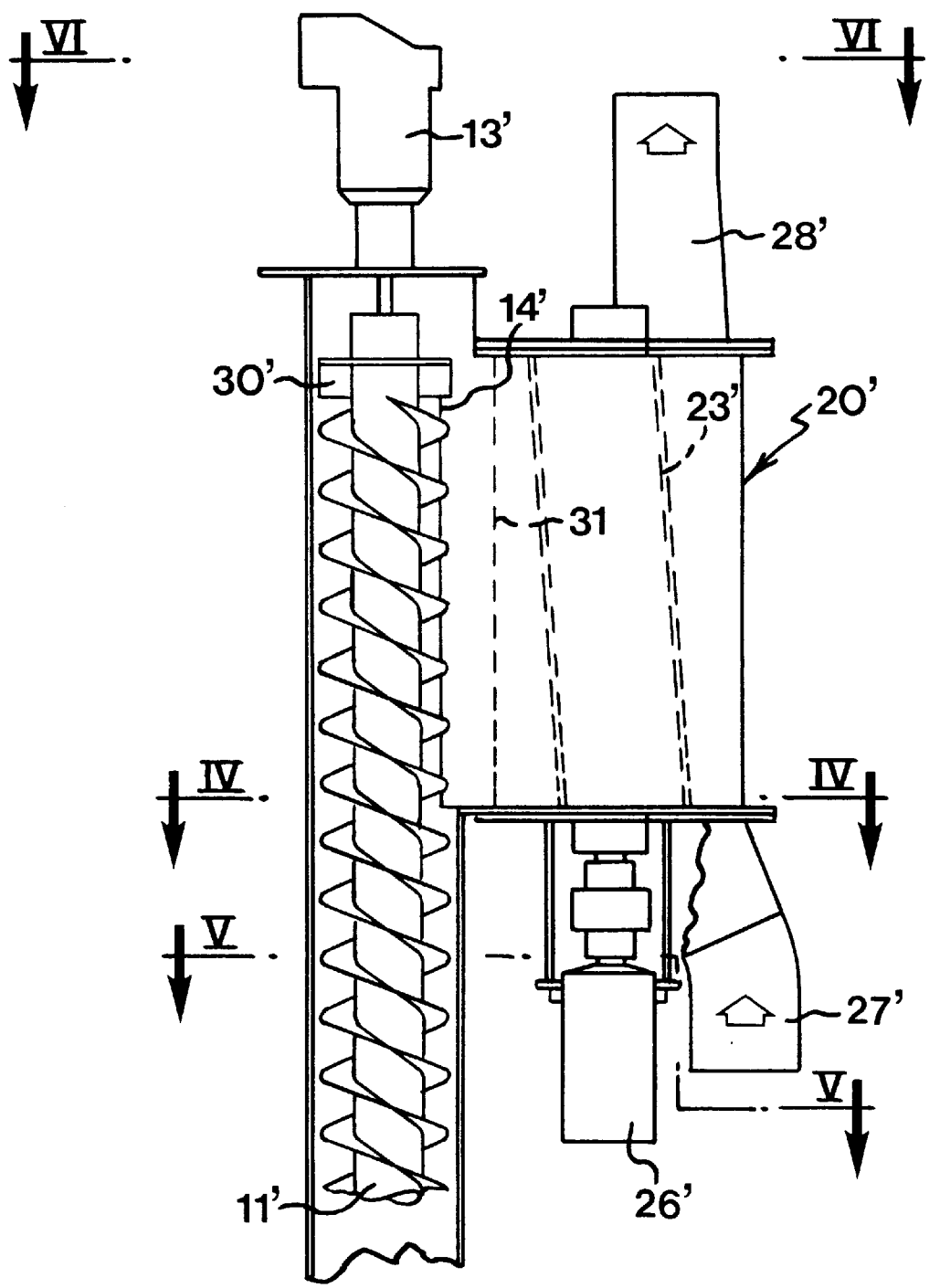
FIG. 3 is a sectional view corresponding to FIG. 1, of another embodiment of the inventive apparatus.

FIG. 1 illustrates the discharge end of a screw conveyor 10 which comprises a feeding screw 11 and a casing 12. The shaft of the feeding screw 11 is connected to a driving motor 13. The feeding screw is mounted to be rotated in the casing 12 while using the conventional technique. Adjacent the discharge end, an elongate, slot-shaped outlet port 14 is formed in the casing 12. This port is connected to an inlet port 31 of the cellular feeder 20.

In the embodiment illustrated, the outlet port 14 is of a length which corresponds to approximately 2.5 times the pitch of the feeding screw, thereby ensuring a complete throwing-out of the bulk goods. In the embodiment illustrated, the outlet port or slot 14 is so wide as to occupy about one third of the circumference of the casing 12. If the outlet port is made narrower (i.e. occupies less than one third of the circumference of the casing), it may be necessary to increase the length of the outlet port 14.

One lateral edge of the inlet port 31 of the rotor chamber 21 of the cellular feeder 20 and one lateral edge of the outlet port 14 in the casing 12 are interconnected by a wall 24 which is arranged substantially tangentially relative to the screw. At the opposite lateral edge of the port 14 there is a similar wall 25 which is connected to the other lateral edge of the inlet port 31. At the top and at the bottom there are end walls, which close the rotor chamber 21 and the transition between the walls 24 and 25. The rotor 22 is connected to a driving motor 26.

For discharging the goods from the cells of the cellular feeder 20, there is an air inlet duct 27 which opens into one end wall of the cellular feeder at an angular distance from the inlet port 31 of the cellular feeder. Correspondingly, there is at the other end wall an outlet duct 28, which constitutes an inlet of the pneumatic conveyor or constitutes the inlet end thereof.

The inventive apparatus is based on the idea that the goods discharged from the screw conveyor 10 should be thrown radially out of the screw conveyor and into the cells of the cellular feeder 20. This results in an efficient and rapid transfer of material, which increases the capacity of the transferring apparatus. To obtain a complete discharge of the supplied goods, the extension of the outlet port 14 in the axial direction should correspond to at least twice the pitch of the flight of the feeding screw. In the embodiment shown, use is made of 2.5 times this pitch. The axial extension may advantageously be still larger, for instance 3–4 times or even 6 times the pitch of the feeding screw. The upper limit, however, is set merely from the practical point of view since too great an axial length entails an unnecessary increase of the length of the apparatus.

To further ensure a complete discharge of goods, a centrifugal impeller 30 is, according to prior-art technique, attached to the shaft of the feeding screw 11 at the end of the screw flights. This centrifugal impeller 30 thus throws any remaining goods into the cellular feeder 20.

Figure 2:
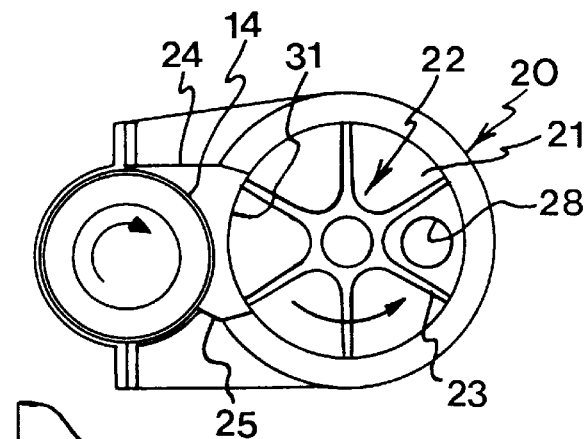
FIG. 2 is a sectional view along line II—II in FIG. 1.

FIGS. 3–6 illustrate a second embodiment of an apparatus according to the present invention. This apparatus differs from the one in FIGS. 1 and 2 above all by the cells of the cellular feeder 20' being defined by means of vanes 23', which are inclined like the knives of a rotary mower. Correspondingly, the inlet 27' and the outlet 28' are angularly offset relative to one another, such that the air flow passes between the inclined cell walls 23' defining an individual cell. According to the embodiment in FIG. 3, the direction of the air flow through the cellular feeder 20' has, besides, been reversed.

The reason for inclining the cell walls 23' relative to the axial direction of the cellular feeder 20 is that, owing to this inclination, the cell walls will act as a mower knife and, thus, reduce the stress and shocks in the cellular feeder when they pass the front and rear edge of the inlet port 31.

Since an excess pressure prevails in the cell that is for the moment connected to the inlet duct 27 and the outlet duct 28, an excess pressure prevails in the cell also after discharge. If this excess pressure remains in the cell when this is opened towards the inlet port 31, the reduction of the pressure could result in a deterioration of the transfer of material. To remedy this, the pressure in the emptied cell chamber can be reduced by letting this pass evacuation apertures 32 which are formed in one or both end walls of the cellular feeder 20, for instance, as schematically illustrated in FIG. 7. Such a pressure reduction can be used in all the embodiments of the invention. In this embodiment, the apertures 32 are arranged along a radial line such that only one cell at a time is relieved from pressure.

FIG. 8 illustrates how the inclined cell-defining vanes 23' according to the embodiment in FIGS. 3–6 move along the circumferential surface of the cellular feeding chamber 21'. The rectangle 31 indicated by thick lines represents the inlet port 31' of the cellular feeder 20'. The inclined lines in FIG. 8 represent the contact lines between the individual inclined vanes 23' and the circumferential surface of the chamber 21'. FIG. 8 also shows an alternative way of reducing the excess pressure in an emptied cell by using a pressure relief opening 33.

As shown in the Figure, two vanes 23', which between themselves define a cell, are located substantially completely within the inlet port 31 when passing this. It is also evident from FIG. 8 that the air inlet duct 27' and the air outlet duct 28' to the pneumatic conveyor are relatively offset, corresponding to the inclination of the vanes 23'. In addition, the outlet duct 28' has been expanded such that, in the final position, it should fully correspond to the space between two successive vanes 23'. The Figure also indicates a possibility of evacuating air through a wide pressure relief opening 33, which corresponds to the small pressure relief apertures 32 in FIG. 7.

FIGS. 9–14 show the relative positions of the cell and the inlet port in six successive positions, which are displaced by 12° relative to each other. In this embodiment, the cellular feeder rotates at such a speed that the time interval between the position 0° in FIG. 9 and the position 60° in FIG. 14 is 0.25 s. It is thus apparent from the Figures that in the initial filling position (FIG. 10), a first cell C1 is completely filled while the filling of a subsequent cell C2 is initiated. In the position illustrated in FIG. 14, the filling procedure for an individual cell is completed, and this corresponds to a cell position according to the inlet port 31 as indicated by full thick lines in FIG. 8.

In the embodiments illustrated, use is made of only six cells in the cellular feeder 20, 20'. When operating with high material supplying speeds, it may be advantageous to have a still larger number of cells. The effect of the material being thrown out of the screw conveyor into the cellular feeder provides precisely this possibility of high material conveying speeds. This has not been possible in prior-art transferring apparatus. An increase of the number of cells also confers the advantage that the number of sealing surfaces between the cell that is just being emptied, and the cell that is just being filled, becomes greater, thus increasing the tightness.

In the embodiments shown, the shafts of the screw conveyor and the cellular feeder are arranged in parallel with each other, which is the preferred embodiment. Within the scope of the invention, the shafts may, however, make an angle with each other or even be swingable relative to each other. In such cases, a transition is formed between the outlet port from the screw conveyor and the inlet port to the cellular feeder in the form of a hopper. If a possibility of swinging is desired, a parting plane and a sealing device can be formed in the transition housing between these two ports. To this end, use can be made of an apparatus as disclosed in SE-B-406,070. When using such an apparatus, it may be convenient to decrease the length of the cellular feeder and increase the diameter thereof and increase the number of cells to make it possible to handle large flows of material.

In the shown embodiments of the invention, the inlet 31 and the outlet 28 have been arranged approximately diametrically opposite each other. In order to increase the number of sealing surfaces between the outlet 28 and the inlet 31 and, thus, reduce the risk of compressed air leaking between the pneumatic conveyor and the inlet of the cellular feeder, it is also possible (in addition to the above-mentioned measure of using pressure relief apertures and openings) to angularly displace the outlet 28 clockwise in respect of, for instance, FIG. 2, however, while ensuring that at least one filled cell in the cellular feeder is positioned between the inlet 31 and the outlet 28. In fact, it has been found that the filled cells make a reliable seal between the high-pressure side (outlet 28) and the low-pressure side (inlet 31) in the cellular feeder. This reliable seal is assumed to be caused by the bulk goods being thrown into the cells and therefore being compacted therein or, in any case, obtaining a sufficient capability to act as sealing material.

As a special embodiment, it may be mentioned that tests have been carried out with a transferring apparatus designed according to FIGS. 3–6. In this case, each outlet port was of a length of 680 mm in the axial direction of the feeding screw. The width of the port was 205 mm, and the pitch of the feeding screw was 200 mm and the outer diameter 246 mm. The inner diameter of the tube was 260 mm. When this apparatus was used to transfer kaolin from the screw conveyor to the pneumatic conveyor and was operated at the speed of 650 rpm, it was established that the kaolin material was transferred over the entire axial length of the outlet port. The material transferring speed was 120 tonnes/h, and the cells of the cellular feeder were filled completely with the bulk goods.

I claim:

1. An apparatus for transferring bulk goods, comprising:
   a supplying conveyor (10) which is a high-speed screw conveyor including a casing (12) and a feeding screw (10) which has an axis,
   a discharging conveyor (28) formed as a pneumatic conveyor; and
   a transition housing (20), through which bulk goods pass in going from said screw conveyor to said pneumatic conveyor, and
   said transition housing (20) being formed as a cellular feeder (20), which comprises a cylindrical rotor chamber (21) having a circumferential wall and end walls, and a rotor (22) axially arranged in the rotor chamber and having projecting, cell-defining vanes (23),
   said screw conveyor (10) having said casing (12) provided with a longitudinally extending outlet port, said outlet port (14) communicating with an inlet port (31) in the circumferential surface of the rotor chamber (21) for substantially radial feeding of goods into the cellular feeder (20), said cellular feeder (20) having, at an angular distance from the inlet port (31), an outlet (28) for substantially axial discharge of the goods from the cellular feeder to the pneumatic conveyor (28), and the longitudinal outlet port (14) of the screw conveyor (10) in the casing (12) being of a length in the direction of said feeding screw that is at least twice the pitch of the feeding screw axis (11) in the area of the outlet port, said high-speed conveyor being a means for throwing bulk goods into said transition housing regardless of whether said screw axis is horizontal, inclined or vertical.

2. The apparatus as claimed in claim 1, characterised in that the cellular feeder (20) and the screw conveyor (10) are substantially parallel.

3. The apparatus as claimed in claim 1, characterised in that the outlet port (14) in the casing (12) of the screw conveyor (10) is slot-shaped.

4. The apparatus as claimed in claim 1, characterised in that a centrifugal impeller (30) is arranged on the feeding screw (11) of the screw conveyor (10) on the same level as the outlet port (31) for providing a final discharge of goods from the screw conveyor (10) to the cellular feeder (20).

5. The apparatus as claimed in claim 1, characterised in that the cellular feeder (20) comprises at least one pressure relief aperture or opening (32, 33) for reducing the air pressure in emptied cells in a position before the inlet port (31) to the rotor chamber (21) of the cellular feeder.

6. The apparatus as claimed in claim 1, characterised in that the length of the outlet port in the axial direction of the feeding screw is 6 times the pitch of the feeding screw at most.

7. The apparatus as claimed in claim 1, characterised in that the length of the outlet port in the axial direction of the feeding screw is 2–6 times the pitch of the feeding screw.

8. The apparatus as claimed in claim 1 wherein said cells of said cellular feeder are dimensioned and arranged so as to preclude pneumatic conveyor pressure from reaching said screw conveyor during a feeding operation.

9. The apparatus as claimed in claim 1, characterised in that the cell-defining vanes (23) of the cellular feeder (20) are arranged helically relative to the shaft of the rotor (22).

10. The apparatus as claimed in claim 5, characterised in that the pitch of the cell-defining vanes (23) is such that two successive vanes (23) are located substantially entirely within the inlet port (31) of the cellular feeder (20) while passing said port.

11. A transfer apparatus for transferring bulk goods, comprising:
- a high-speed, bulk goods supplying screw conveyor including a casing (12) and a feeding screw (10) which has an axis;
- a discharging pneumatic conveyor;
- a cellular feeder positioned between, and in bulk material feed communication with, said screw conveyor and pneumatic conveyor, said cellular feeder defining a rotor chamber having a circumferential wall, and said transfer apparatus including end walls which define first and second ends of said rotor chamber, and said cellular feeder including a rotor axially arranged in said rotor chamber and having projecting, cell defining vanes,
  - said screw conveyor having said casing with a longitudinally extending outlet port, said outlet port being that is in feeding communication with an inlet port of said rotor chamber for substantially radial feeding of goods into the cellular feeder, said cellular feeder having, at an angular distance from the inlet port, an outlet for substantially axial discharge of the goods from the cellular feeder to the pneumatic conveyor, and
  - said outlet port in said casing of the screw conveyor is of a length in the direction of said feeding screw axis that is at least twice the pitch of the feeding screw axis in the area of the outlet port, said high-speed conveyor being a means for throwing bulk goods into the cells defined by said vanes regardless of whether said screw axis is horizontal, inclined or vertical.

12. The transfer apparatus as claimed in claim 11, characterised in that the cellular feeder and the screw conveyor are substantially parallel.

13. The transfer apparatus as claimed in claim 11, characterised in that the outlet port in the casing of the screw conveyor is slot-shaped.

14. The transfer apparatus as claimed in claim 11, characterised in that a centrifugal impeller is arranged on the feeding screw of the screw conveyor on the same level as the outlet port for providing a final discharge of goods from the screw conveyor to the cellular feeder.

15. The transfer apparatus as claimed in claim 11, characterised in that the cell-defining vanes of the cellular feeder are arranged helically relative to the shaft of the rotor.

16. The transfer apparatus as claimed in claim 11, characterised in that the pitch of the cell-defining vanes is such that two successive vanes are located substantially entirely within the inlet port of the cellular feeder while passing said port.

17. The transfer apparatus as claimed in claim 11, characterised in that the cellular feeder comprises at least one pressure relief aperture or opening for reducing the air pressure in emptied cells in a position before the inlet port to the rotor chamber of the cellular feeder.

18. The transfer apparatus as claimed in claim 11, characterised in that the length of the outlet port in the axial direction of the feeding screw is 6 times the pitch of the feeding screw at most.

19. The transfer apparatus as claimed in claim 11, characterised in that the length of the outlet port in the axial direction of the feeding screw is 2–6 times the pitch of the feeding screw.

20. The transfer apparatus as claimed in claim 11, wherein said apparatus is dimensioned and arranged such that said screw conveyor is operational at a speed of 650 rpm.

21. The transfer apparatus as claimed in claim 11, wherein said apparatus is dimensioned and arranged such that said apparatus is operational to transfer 120 tonnes/h of material with an outlet port length of 2–6 times the pitch of the feeding screw.

22. The transfer apparatus as claimed in claim 11, wherein said cells of said cellular feeder are dimensioned and arranged so as to preclude pneumatic conveyor pressure from reaching said screw conveyor during a feeding operation.

23. The transfer apparatus as claimed in claim 22, wherein said individual cells are individually pressurizable, and said cellular feeder includes a pressure release opening circumferentially between said outlet port of said screw conveyor and the inlet port of said pneumatic conveyor.

* * * * *